United States Patent Office 3,160,677
Patented Dec. 8, 1964

3,160,677
POLYAMIDE-POLYOXAMIDE BLENDS
Frederick Keith Duxbury, Manchester, England, assignor to Imperial Chemical Industries Limited, London, England, a corporation of Great Britain
No Drawing. Filed June 7, 1961, Ser. No. 115,311
Claims priority, application Great Britain, June 20, 1960, 21,531
9 Claims. (Cl. 260—857)

This invention relates to fibre-forming polyamides.

It is known that, although commercially important polyamides such as polyhexamethylene adipamide and polycaproamide have excellent physical properties in many respects, for certain textile applications fibres made from these polymers are somewhat deficient in their ability to recover rapidly from deformation by stretching or creasing. In textile technology the recovery properties of a yarn may be assessed by measurement of its "Work Recovery" and "Elastic Recovery" as described for example in the Textile Research Journal, 1952, page 144.

It is disclosed in U.K. specification No. 781,289 that certain novel polyamides derived from oxalic acid can be melt spun to fibres which have better recovery properties than the polyamide fibres which are generally available in commerce. We have now made the surprising discovery that the fibres spun from melt blends of an ordinary polyamide (A) of the general type described in U.K. specifications Nos. 461,236 and 461,237 and U.S. patent specifications Nos. 2,071,250, 2,071,253 and 2,130,948, with a polyoxamide (B) as described in U.K. specifications Nos. 737,939, 740,928, 781,289 and 793,451 possess recovery properties similar to those of the polyoxamide component (B) alone, even when the latter forms only a minor proportion of the blend. Especially suitable polyoxamide components are those described in U.K. specification No. 793,451, the polyamides being formed from oxalic acid diesters and diprimary amines, preferably under conditions such that the initial stage of the polymerisation process is performed at a temperature below 220° C. in the presence of an organic liquid which may be either an entraining agent of boiling point higher than the alcohol liberated or preferably a liquid which is able to form an azeotrope with the alcohol liberated during the initial stage of the polymerisation process, the entraining or azeotroping liquid being present in sufficient amount to ensure that all the alcohol is removed before completion of the polymerisation, such completion of polymerisation being performed preferably at atmospheric pressure by heating at a temperature of from 200° to 300° C. Such processes for the manufacture of polyoxamides are more fully described in French patent specification No. 1,250,887.

Thus according to the present invention we provide improved fibre forming polymer blends comprising a polyamide (A) as defined herein and a proportion of a polyoxamide (B) as defined herein.

The polymer blends of the present invention may be prepared by thoroughly mixing with good agitation the preformed components (A) and (B) in the molten condition. Alternatively the constituent parts of the polyoxamide component (B) may be subjected to polymerising conditions in presence of the molten preformed polyamide component (A), the blend of (A) and (B) so obtained being blended if desired with a further proportion of (A).

As examples of polyamides which are especially suitable for use as component (A) there may be mentioned the commercially important polymers poly(hexamethylene adipamide), poly(hexamethylene sebacamide), poly(-caproamide), and poly(11-undecanoamide).

As examples of the polyoxamides which are especially suitable for use as component (B) there may be mentioned the polyoxamides and copolyoxamides of the following diamines: pentamethylene diamine, hexamethylene diamine, heptamethylene diamine, octamethylene diamine, nonamethylene diamine, decamethylene diamine, 2-methyl- and 3-methyl hexamethylene diamines, 3-methoxyhexamethylene diamine, 2:3-, 2:4-, 2:5- and 3:4-dimethylhexamethylene diamines, 2:11-diaminododecane, metaxylylene diamine, and the reaction products of caprolactam and hexamethylene diamine described in U.S. patent specification No. 2,756,257. When the polyoxamide component is modified with a polyether as described in U.K. specification No. 793,451 the blends possess the additional desirable properties of greatly reduced tendency to static electrification and possess improved dyeing properties. Such modification is achieved by copolymerising, e.g., oxalic acid or an oxalate diamine such as hexamethylene diamine and a polyether component having at the ends of its chains either amine or carboxylic acid or ester groups which will enter into the condensation reaction. More particularly, in said British Patent 793,451, there are described copolymers of oxalic acid, a diamine, and a polyether component containing —(OCH$_2$CH$_2$)$_m$— in which $m$ is a whole number greater than 20, having as end groups either a carboxylic acid or ester or amino group. Generally and preferably, the polyether component constitutes 5–25% based on the total weight of the copolymer.

The physical structure of our fibre forming polymer blends is not yet completely known but it seems probable that the blend is not a simple solution of one polymer in the other but may be a disperse system in which the polyamide component (A) is dispersed in the polyoxamide component (B). There may also be some degree of chemical interaction between the components during the melt blending process so that the blend contains block copolymers.

Surprisingly, the improvement in recovery properties of fibres from the blend as compared with the fibres from the polyamide component (A) alone is apparent even when the polyoxamide component (B) is present in the blend in relatively small proportions. Thus as little as 5% by weight of component (B) in the blend brings about a marked improvement in recovery properties and blends containing not more than about 40% by weight of component (B) have recovery properties substantially the same as those of component (B) alone. An increase of component (B) above about 40% does not bring about any further change in recovery properties. This absence of a gradual change of recovery properties with alternation of proportions is most unexpected and provides a valuable means of improving the recovery properties of conventional polyamides in a simple manner at low cost, by incorporation with them of a minor proportion of a polyoxamide (B). At the present time polyamides of type (A) are readily made and comparatively inexpensive, but polyoxamides of type (B) are more inaccessible and difficult to obtain and considerably more costly. Polymer blends according to the present invention usually contain from 5% to 40% of polyoxyamide (B), but more than this amount of the polyoxamide may be employed if desired. Especially useful proportions of polyoxamide composition (B) are from 10% to 30%.

The invention is illustrated but not limited by the following example in which parts and percentages are by weight.

*Example 1*

51.1 parts of diethyloxalate and 60 parts of xylene are added to 46.4 parts of 3-methylhexamethylene diamine and 60 parts of xylene. The precipitated prepolymer is stirred under nitrogen and heated to between 160° C. and 170° C. until 120 parts of distillate, essentially xylene and ethanol, have collected. 15 parts of the residue and 45 parts of an acetic acid stabilised hexamethylene adipamide polymer of melt viscosity 600 poises as measure at 280° C. are then heated under nitrogen for 1 hour at 285° C. and atmospheric pressure. The resulting polymer which contains 25% by weight of the oxamide component has a melting point of 267° C. determined by the penetrometer method described in the Journal of the Chemical Society 1952, p. 2638, and a melt viscosity at 280° C. of 4066 poises. Fibres rod-spun from the polymer have the following physical properties.

|  | Polymer Blend | Hexa-methylene Adipamide Polymer |
|---|---|---|
| Denier | 88 | 86 |
| Tenacity (g./den.) | 6.7 | 4.1 |
| Extensibility (percent) | 14.9 | 18.6 |
| Initial modulus (g./den.) | 38.8 |  |
| Work Recovery Percent: |  |  |
| 1% Extension | 81.9 | 69.2 |
| 4% Extension | 70.5 | 74.7 |
| Elastic Recovery Percent: |  |  |
| 1% Extension | 95.0 | 86.4 |
| 4% Extension | 94.5 | 95.0 |

The physical properties of the films obtained by rod-spinning an acetic acid stabilised hexamethylene adipamide polymer of melt viscosity 600 poises (measured at 280° C.) have been tabulated for the purpose of comparison.

The Initial Modulus was measured on the Cambridge Extensometer using a 25 cm. test length and a constant rate of loading of 1 g./denier/min.

The Work and Elastic Recoveries were measured on the Cambridge Textile Extensometer using a 1 meter test length and a constant rate of loading of 1 g./denier/min.

The Tenacity and Extensibility were measured on the Goodbrand Single Thread Tester using a 25 cm. test length and a rate of traverse of 12 inches per minute. The fibres were not conditioned before testing.

*Example 2*

20.20 parts of di-n-butyl oxalate and 18 parts of xylene are added with rapid agitation to a mixture of 13.05 parts of 3-methylhexamethylenediamine, 18 parts of xylene and 0.8 part of a $TiO_2$ dispersion in xylene (7% w./w.). The precipitated prepolymer is stirred under nitrogen and heated to between 180° and 190° C. until 43 parts of distillate have collected. 18 parts of the residue and 6 parts of an acetic acid stabilised, 0.3% $TiO_2$ delustred, hexamethylene adipamide polymer of melt viscosity 600 poises (measured at 280° C.) are heated under nitrogen with agitation for 1 hour at 285° C. and atmospheric pressure. The polymer so formed, and a further 36 parts of the above hexamethylene adipamide polymer are then melt blended by heating under nitrogen with agitation for 20 minutes at 285° C. and atmospheric pressure. The resulting polymer which contains 30% by weight of the oxamide component has a melting point of 266° C. (determined as described in Example 1) and melt viscosity at 280° C. of 814 poises. Films rod spun from the polymer have the following properties.

|  | Polymer Blend | Hexa-methylene Adipamide Polymer |
|---|---|---|
| Denier | 130 | 100 |
| Tenacity (g./den.) | 5.1 |  |
| Extensibility (percent) | 17.0 |  |
| Initial Modulus (g./den.) | 30.1 |  |
| Work Recovery Percent: |  |  |
| 1% Extension | 81.0 | 67.1 |
| 4% Extension | 62.7 | 50.3 |
| Elastic Recovery Percent: |  |  |
| 1% Extension | 90.5 | 85.3 |
| 4% Extension | 83.4 | 78.3 |

The fibre properties of an acetic acid stabilised hexamethylene adipamide polymer of melt viscosity at 280° C. of 800 poises have also been tabulated for comparison. The physical properties of the fibres were measured as described in Example 1. The fibres were conditioned in a relaxed state at a relative humidity of 65% at 68° F. for approximately 24 hours before testing.

*Example 3*

20.20 parts of di n-butyl oxalate and 18 parts of xylene are added with rapid agitation to a mixture of 13.26 parts of 3-methylhexamethylenediamine, 18 parts of xylene and 0.6 part of a $TiO_2$ dispersion in xylene (9% w./w.). The precipitated prepolymer is stirred under nitrogen and heated to between 180° and 190° C. until 42 parts of distillate, essentially xylene and n-butanol, have collected. The residue is then heated under nitrogen for 1 hour at 263° C. 15 parts of the polymer so formed, and 45 parts of a polycaprolactam of inherent viscosity 0.995 (measured as a 0.5% w./v. solution in formic acid/water, 90/10 v./v.) are melt blended by heating under nitrogen with agitation for 1 hour at 263° C. and atmospheric pressure. The resulting polymer has a melting point of 237° C. (determined as described in Example 1) and a melt viscosity at 260° C. of 2012 poises. Fibres rod spun from the polymer have the following physical properties.

Denier _____ 148
Tenacity (g./den.) _____ 4.5
Extensibility (percent) _____ 15.7
Initial modulus (g./den.) _____ 22.9
Work recovery, percent:
    1% extension _____ 81.0
    4% extension _____ 61.8
Elastic recovery, percent:
    1% extension _____ 89.0
    4% extenstion _____ 83.7

The physical properties of the fibres were measured as described in Example 1. The fibres were conditioned in a relaxed state at a relative humidity of 65% at 68° F. for approximately 24 hours before testing.

*Example 4*

20.46 parts of di n-butyl oxalate and 18 parts of xylene are added to a mixture of 10.44 parts of 3-methylhexamethylenediamine, 2.33 parts of hexamethylenediamine, 0.6 part of a $TiO_2$ dispersion in xylene (9% w./w.), 18 parts of xylene and 6.04 parts of a polyoxyethylene-α-ω-diamine of Equivalent weight 2320. The precipitated prepolymer is stirred under nitrogen and heated to between 180° and 190° C. until 46 parts of distillate have collected. The residue and 6 parts of an acetic acid stabilised, 0.3% $TiO_2$ delustered, hexamethylene adipamide polymer of melt viscosity 600 poises (measured at 280° C.) are heated under nitrogen for 1.5 hours at 285° C. and atmospheric pressure. 20 parts of the polymer so formed, and a further 40 parts of the above hexamethylene adipamide polymer are then melt blended by heating under nitrogen with agitation for 20 minutes at 285° C. and atmospheric pressure. The resulting polymer has a melting point of 267.5° C. (determined as described in Example 1) and a melt viscosity at 280° C. of 2988 poises. Fibres rod spun from the polymer have the following physical properties.

| | |
|---|---|
| Denier | 131 |
| Tenacity (g./den.) | 4.5 |
| Extensibility (percent) | 16.7 |
| Initial modulus (g./den.) | 24.4 |
| Work recovery, percent: | |
|   1% extension | 77.6 |
|   4% extension | 60.2 |
| Elastic recovery, percent: | |
|   1% extension | 87.3 |
|   4% extension | 82.0 |
| Static charge | Nil |
| Static charge (after extraction with chloroform for 24 hours, μμcoulombs/metre | 680 |
| Static charge (after scouring), μμcoulombs/metre | 810 |

The primary physical properties of the fibres were measured as described in Example 1. The fibres were conditioned in a relaxed state at a relative humidity of 65% at 68° F. for approximately 24 hours prior to testing.

The static charge was measured by running the yarn round an insulated stainless steel peg at 30 yards per minute and determining the time required to charge a condenser of known capacitance to 2.5 volts. When measured by this procedure a hexamethylene adipamide polymer has a static charge of 20,000 μμcoulombs/metre.

The yarn was scoured by boiling for 2 hours in a solution which contained 2 g./l. of soap and 1 g./l. of soda ash.

The polyoxyethylene α:ω-diamine was prepared as follows. A mixture of 500 parts of polyoxyethylene glycol 4,000 and 870 parts of toluene were heated until distillation of the toluene/water azeotrope was completed. 31 parts of thionyl chloride were added over 0.5 hour to the residual solution which was next refluxed for 4 hours and then heated at 130° C. and atmospheric pressure until 260 parts of toluene had distilled. The resulting solution was treated with a further 260 parts of toluene and substantially all of the toluene was then removed by heating the mixture so formed initially at 130° C. and atmospheric pressure and finally at 100° C. and 0.5–2.0 mm. pressure. After the addition of 20 parts of decolourising carbon, the molten α:ω-dichloropolyoxyethylene was heated at 100° C. for 4 hours with agitation and then filtered. The carbon treatment with repeated. 375 parts of the α:ω-dichloropolyoxyethylene so prepared, was charged together with 575 parts of anhydrous liquid ammonia to a pressure vessel equipped with agitator and heated for 10 hours at 80° C. under autogenous pressure. The solid reaction product was dissolved in 1000 parts of water and treated with a solution of 20 parts of sodium carbonate and 50 parts of water. 900 parts of xylene were added and water was removed from the mixture by distillation of xylene/water azeotrope. The resulting anhydrous solution was filtered and the xylene distilled from the filtrate at 100° C. and 20 mm. pressure. The polyoxyethylene α:ω-diamine was finally heated for 2 hours at 100° C. and 0.5 mm. pressure to remove the last traces of solvent. A polyoxyethylene-α:ω-diamine of Equivalent Weight 2320 was obtained.

*Example 5*

20.40 parts of di n-butyl oxalate and 13.5 parts of xylene are added with rapid agitation to a mixture of 13.10 parts of 3-methylhexamethylenediamine, 0.5 part of a TiO$_2$ dispersion in xylene (10% w./v.) and 13.5 parts of xylene. The precipitated prepolymer is stirred under nitrogen and heated to between 180° and 190° C. until 35 parts of distillate have collected. 4.6 g. parts of a polyoxyethylene-α:ω-diamine of Neutral Equivalent 2320 are then well mixed with the residue and the resulting mixture is heated under nitrogen for 1 hour at 285° C. and atmospheric pressure.

15 parts of the polymer, so formed, and 45 parts of a hexamethylene adipamide polymer stabilized by 4% mol. excess of hexamethylenediamine, and having a melt viscosity of 133 poises (measured at 280° C. are then melt blended by heating under nitrogen with agitation for 1 hour at 285° C. and atmospheric pressure. The resulting polymer has a melting point of 266° C. (determined as described in Example 1) and a melt viscosity at 280° C. of 2564 poises. The properties of the fibres obtained by rod spinning the polymer are recorded below together with those of a fibre obtained by rod spinning a 15% (w./w.) polyoxyethylene-α:ω-diamine (N.E. 2320) modified 3-methylhexamethylene oxamide polymer of melt viscosity 955 poises (measured at 280° C.).

| | Polymer Blend | Polyoxyethylene-α:ω-diamine modified 3-methylhexamethylene oxamide polymer |
|---|---|---|
| Denier | 127 | 135 |
| Tenacity (g./den.) | 4.3 | 3.5 |
| Extensibility (percent) | 18.6 | 13.6 |
| Initial Modulus (g./den.) | 29.3 | 30.8 |
| Work Recovery Percent: | | |
|   1% Extension | 80.5 | 84.8 |
|   4% Extension | 68.4 | 56.5 |
| Elastic Recovery Percent: | | |
|   1% Extension | 92.4 | 96.0 |
|   4% Extension | 84.8 | 80.2 |
| Static charge | 1 –280 | Nil |
| Static Charge (after extraction with chloroform for 24 hours) | 1–1,800 | 1–3,500 |
| Static Charge (after scouring) | 1–2,200 | |

[1] μμ Coulombs/metre.

The primary physical properties of the fibres were measured as described in Example 1. The fibres were conditioned in a relaxed state at a relative humidity of 65% at 68° F. for approximately 24 hours prior to testing. The static charge was measured, and the fibres were scoured, by the procedures described in Example 4. The polyoxyethylene-α:ω-diamine was prepared as described in Example 4.

What I claim is:

1. A fiber-forming polymer blend comprising about 60–95% of a polyamide selected from the group consisting of polyhexamethylene adipamide, polyhexamethylene sebacamide, poly-ε-caproamide and poly-11-undecanoamide and about 5–40% of a polyoxamide of at least one amine component selected from the group consisting of pentamethylene diamine, hexamethylene diamine, heptamethylene diamine, octamethylene diamine, nonamethylene diamine, decamethylene diamine, 2-methyl- and 3 - methylhexamethylene diamines, 3 - methoxy - hexamethylene diamine, 2:3-, 2:4-, and 2:5- and 3:4-dimethylhexamethylene diamines, 2:11-diamino dodecane, meta-xylylene diamines, and the reaction products of caprolactam and hexamethylene diamine.

2. A fiber-forming polymer blend as set forth in claim 1 in which the polyoxamide is a copolymer of oxalic acid, said amine component and about 5–25% by weight based on the total weight of said copolymer of a polyethylene oxide having at least 20 —(OCH$_2$CH$_2$)— groups and end groups selected from the class consisting of carboxy groups and —NH$_2$ groups.

3. A fiber-forming polymer blend as set forth in claim 1 in which said amine component is 3-methylhexamethylene diamine and said polyamide is polyhexamethylene adipamide.

4. A fiber-forming polymer blend as set forth in claim 1 in which said amine component is 3-methylhexamethylene diamine and said polyamide is polycaprolactam.

5. A fiber-forming polymer blend as set forth in claim 1 in which said amine component is a mixture of 3-methylhexamethylene diamine, hexamethylene diamine and a polyoxyethylene-α-ω-diamine and said polyamide is polyhexamethylene adipamide.

6. A fiber-forming polymer blend as set forth in claim 1 in which the amine component is a mixture of 3-methylhexamethylene diamine and polyoxyethylene-α:ω- diamine and said polyamide is polyhexamethylene adipamide.

7. A process for making a fiber-forming polymer blend which comprises blending, in the molten state, about 60–95% of a polyamide selected from the group consisting of polyhexamethylene adipamide, polyhexamethylene sebacamide, poly-ε-caproamide and poly-11-undecanoamide and about 5–40% of a polyoxamide of at least one amine component selected from the group consisting of pentamethylene diamine, hexamethylene diamine, heptamethylene diamine, octamethylene diamine, nonamethylene diamine, decamethylene diamine, 2-methyl- and 3-methylhexamethylene diamines, 3-methoxy-hexamethylene diamine, 2:3-, 2:4-, and 2:5- and 3:4-dimethylhexamethylene diamines, 2:11-diamino dodecane, meta-xylylene diamines, and the reaction products of caprolactam and hexamethylene diamine.

8. A process for making a fiber-forming polymer blend as set forth in claim 7 in which preformed polyamide and preformed polyoxamide are thoroughly mixed with good agitation in the molten condition.

9. A process for making a fiber-forming polymer blend as set forth in claim 7 in which a prepolymer of the constituent parts of said polyoxamide is subjected to polymerization in the presence of molten preformed polyamide component.

References Cited by the Examiner
UNITED STATES PATENTS
2,704,282   3/55   Stamatoff _____ 260—78

MURRAY TILLMAN, *Primary Examiner.*
LEON J. BERCOVITZ, *Examiner.*

Notice of Adverse Decision in Interference

In Interference No. 95,115 involving Patent No. 3,160,677, F. K. Duxbury, POLYAMIDE-POLYOXAMIDE BLENDS, final judgment adverse to the patentee was rendered Mar. 28, 1968, as to claims 1, 7 and 8.

[*Official Gazette October 29, 1968.*]